United States Patent

Holuigue et al.

Patent Number: 5,283,804
Date of Patent: Feb. 1, 1994

[54] PROCESS AND APPARATUS FOR GRAPHITIZING CARBON BODIES

[75] Inventors: Claude Holuigue, le Fayet, France; Heinrich Panholzer, Linz, Austria

[73] Assignee: Voest-Alpine Machinery, Construction & Engineering Gesellschaft M.B.H., Linz, Austria

[21] Appl. No.: 737,053

[22] Filed: Jul. 29, 1991

[30] Foreign Application Priority Data

Aug. 1, 1990 [AT] Austria ................................ 1621/90

[51] Int. Cl.$^5$ .............................................. H05B 3/00
[52] U.S. Cl. .................................. 373/120; 432/126; 432/239; 373/109
[58] Field of Search ........ 373/120, 109, 122, 125–126, 373/92; 264/27, 29.5, 29.6, 29.7; 432/77, 125–126, 239

[56] References Cited

U.S. PATENT DOCUMENTS

| 1,743,888 | 1/1930 | Hamister | 373/92 |
| 3,187,089 | 6/1965 | Cosby et al. | 373/92 |
| 3,359,449 | 12/1967 | Trask | 373/92 |
| 3,540,764 | 11/1970 | Paus et al. | 373/92 |
| 4,015,068 | 3/1977 | Vohler | 373/120 |
| 4,639,929 | 1/1987 | Bernard et al. | 373/120 |
| 4,956,849 | 9/1990 | Holuigue et al. | |

FOREIGN PATENT DOCUMENTS

| 311538 | 4/1989 | European Pat. Off. | |
| 882920 | 11/1961 | United Kingdom | 264/29.6 |
| 2185559 | 7/1987 | United Kingdom | |
| 9118250 | 11/1991 | World Int. Prop. O. | |

Primary Examiner—Bruce A. Reynolds
Assistant Examiner—John A. Jeffery
Attorney, Agent, or Firm—Collard & Roe

[57] ABSTRACT

Carbon bodies to be graphitized are clamped together in a horizontal train, in which adjacent end faces of said bodies adjoin each other, and are heated by a flow of electric current in a graphitizing zone and subsequently cooled in a cooling zone. Individual carbon bodies are added to the train at the entrance of the graphitizing furnace and individual carbon bodies which have been graphitized are removed from the train at the exit of the furnace. To ensure that the train will desirably be held to be self-supporting, adjacent carbon bodies are interconnected at adjoining end faces by axial plugs.

15 Claims, 2 Drawing Sheets

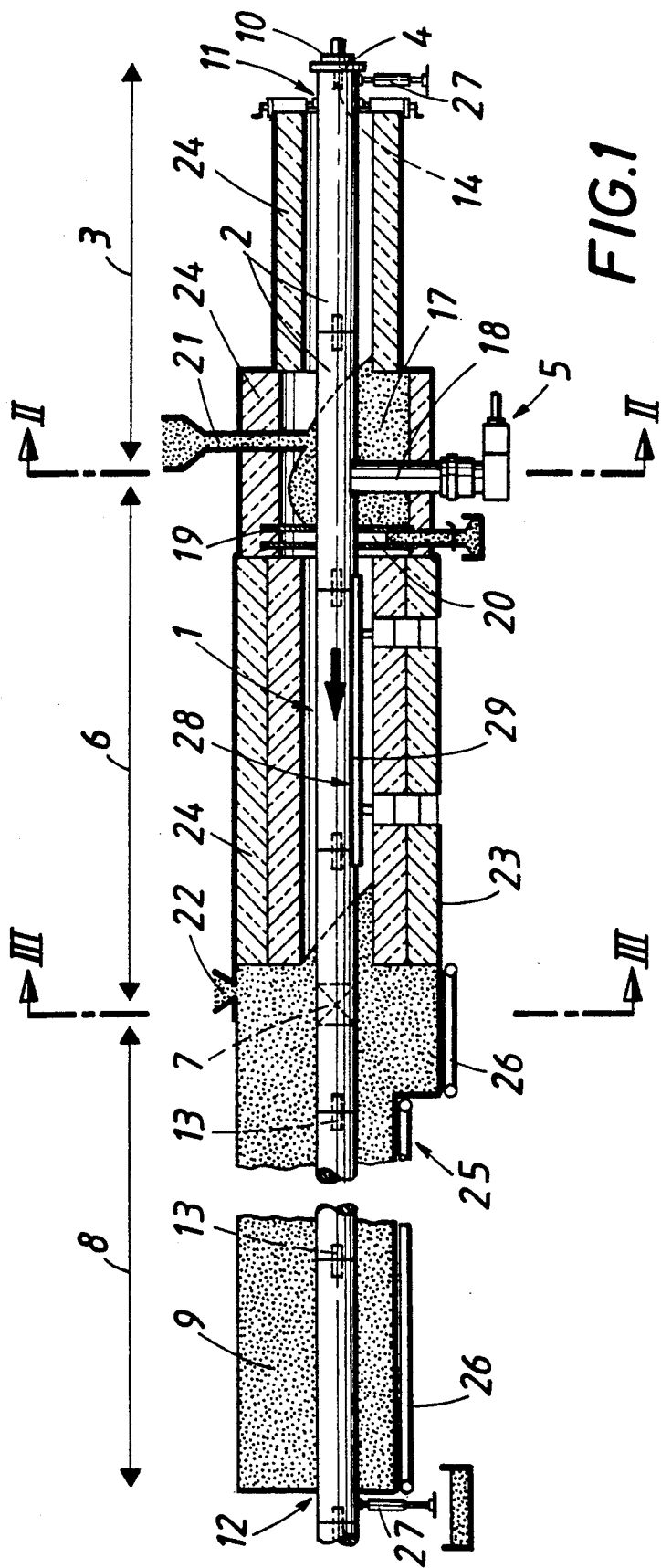

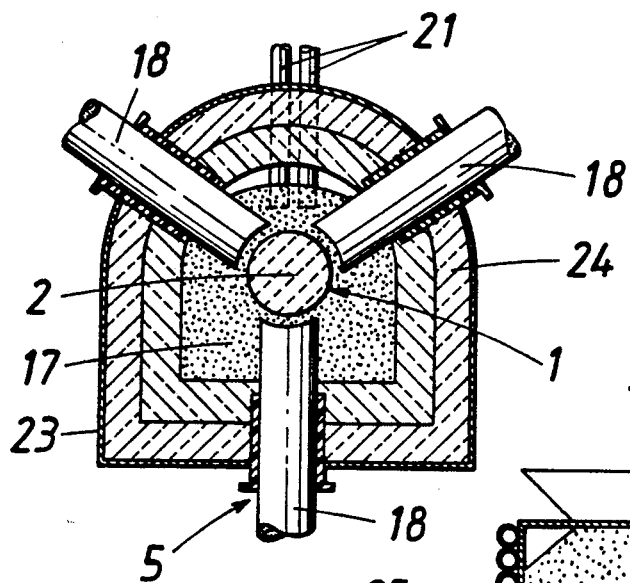
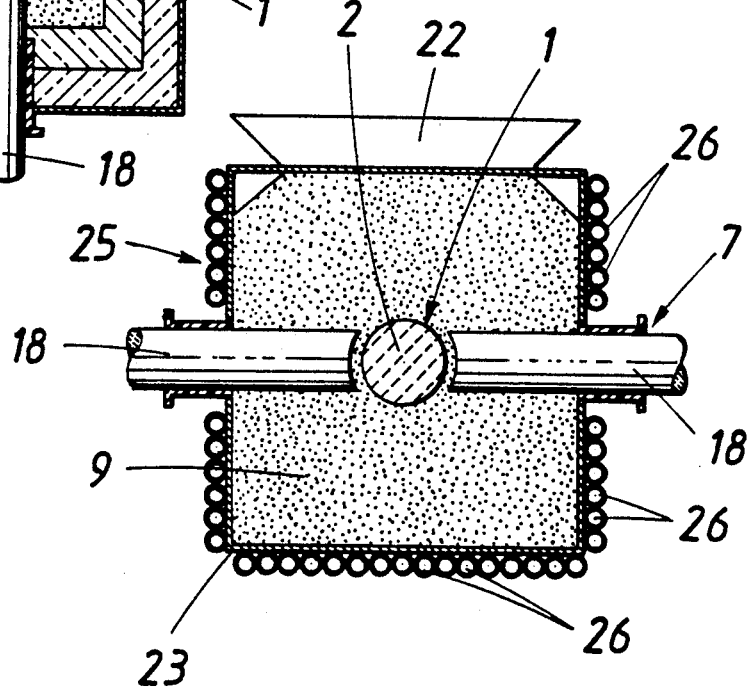
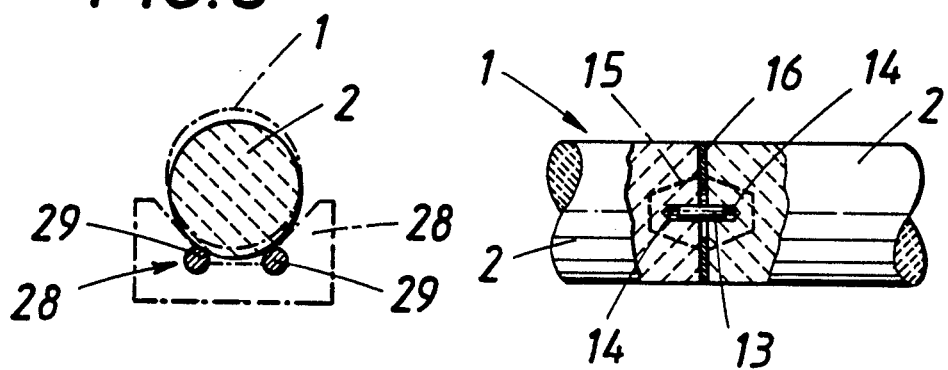

PROCESS AND APPARATUS FOR GRAPHITIZING CARBON BODIES

BACKGROUND OF THE INVENTION

1. Field of the Invention

This invention relates to a process of graphitizing carbon bodies, which are arranged with adjacent end faces of said carbon bodies adjoining each other and are clamped together to form a horizontal train, which is moved through a graphitizing furnace, in which the train is heated by a supply of electric current in a graphitizing zone containing a protective gas atmosphere and is subsequently cooled in a cooling zone. In dependence on the movement of said train through the graphitizing furnace, the train is continually supplemented at the entrance of the furnace in that individual carbon bodies are added to the train, and is continually shortened at the exit of the furnace in that individual carbon bodies are removed from the train. The invention relates also to an apparatus for carrying out the process.

2. Description of the Prior Art

Prefired carbon bodies which are to be graphitized are assembled in a train, in which adjacent end faces of the carbon bodies adjoin each other, and in said train are heated to the required graphitizing temperature by means of electric current which is caused to flow through a length portion of the train. In order to ensure that the graphitizing process can continuously be performed, the train is conveyed through a graphitizing furnace in conveying steps and after each conveying step a carbon body to be graphitized is added to the train at the entrance of the furnace and a graphitized carbon body is removed from the train at the same time at the exit of the furnace. Graphitizing furnaces which are particularly suitable for such a continuous graphitization of carbon bodies which engage each other at adjoining end faces have a horizontal furnace axis although this requires that the horizontally moving train is properly supported. For that purpose it is known to fill the graphitizing furnace with carbonaceous bulk material, such as coke or soot, which will provide the necessary support for the train of carbon bodies and will also avoid the presence of an oxidizing atmosphere in the furnace. But the use of such bulk material has the disadvantage that it must necessarily be heated in the graphitizing zone together with carbon bodies which are to be graphitized so that more energy will be required. Besides, a temperature rise of the carbonaceous bulk material will improve its electrical conductivity so that creepage currents conducted parallel to the train may occur.

In order to avoid said disadvantages it has already been proposed (Austrian Patent Specification 389,506 and the corresponding U.S. Pat. No. 4,956,849) not to fill the graphitizing furnace with carbonaceous bulk material but to provide in the graphitizing furnace a protective gas atmosphere and to axially clamp the train sufficiently to render it self-supporting. Whereas that measure will avoid the disadvantages involved in the use of carbonaceous bulk material, it will be necessary in that case to exert on the train considerable clamping forces in order to render the train self-supporting and the required magnitude of said clamping forces will depend on the length of the train and must even be maintained as a new carbon body is added to the train and a graphitized carbon body is removed from the train so that the structural expenditure will additionally be increased.

SUMMARY OF THE INVENTION

It is an object of the invention to provide for the graphitizing of carbon bodies a process which is of the kind described first hereinbefore and which is so improved that the advantages of the graphitizing under a protective gas atmosphere can be utilized whereas the expenditure involved therein according to the prior art will be avoided.

That object is accomplished in accordance with the invention in that the carbon bodies are interconnected at adjoining end faces by axial plugs or screws as the carbon bodies are assembled to form a train so that the train will be held to be self-supporting at least in a section of the graphitizing furnace.

By that measure the holding of the train to be self-supporting is desirably assisted because the axial plugs or screws which interconnect adjacent carbon bodies at adjoining end faces will effectively prevent a radial offsetting of the adjacent carbon bodies relative to each other. Because the carbon bodies in the train are interconnected at adjoining end faces, much weaker axial gripping forces will have to be exerted on the train to ensure that it will be self-supporting but it will desirably be possible to partly or entirely relieve the train from such pressure forces as carbon bodies are added to and removed from the train. This will particularly be possible if the self-supporting length portion of the train consists only of a few carbon bodies, as will be the case if intermediate supports for the train are provided in the furnace. Such intermediate supports may consist, e.g., of the furnace electrodes. Such supports of the train may also consist of carbonaceous bulk material filling a part of the graphitizing furnace so that much weaker axial gripping forces will be required to hold the train so that it is self-supporting outside the bulk material, particularly if adjacent carbon bodies are interconnected at adjoining ends. Because the bulk material is provided in the graphitizing furnace in the cooling zone, those disadvantages will be avoided which are involved in the presence of such bulk material in the graphitizing zone and which reside in that the bulk material will be heated together with the carbon bodies to be graphitized and in that creepage currents flowing parallel to the train may occur. This is due to the fact that a protective gas atmosphere is provided in the graphitizing zone of the furnace.

Any connecting plugs or screws which are employed will not adversely affect the flow of current in the train because the conduction of current in the outer layers of the carbon bodies will be sufficient for establishing the required current value. But the dowels or screws should not adversely affect the integrity of the train material. For this reason it is recommended to connect adjacent carbon bodies of the train by axial plugs or screws consisting of carbon which is reinforced by carbon fibers, which ensure that said carbon has the required strength properties. Because the means by which the carbon bodies are axially connected are generally disposed adjacent to recesses which will be formed in the graphite electrodes to be made from the carbon bodies and receive corresponding electrode holders, the provision of the bores for receiving the plugs or screws used as axial connecting means will not result in a loss of material in the graphite electrodes.

If the train is held to be self-supporting in a relatively large length, as will mainly be required in graphitizing furnaces containing a protective gas atmosphere in a continuous zone, the provision of means interconnecting the carbon bodies at adjoining end faces may be supplemented by additional means for supporting the train at its normally self-supporting portion in order to avoid an excessive sagging of the train when it has been relieved from the axial gripping forces. It is necessary to ensure that the carbon bodies will be forced back to provide a straight train when axial forces are re-exerted on a train which has sagged. If the carbon bodies have been forced out of alignment only to a small extent from the positions corresponding to a straight train, that desired result will be produced. The train cannot fall apart because the carbon bodies are interconnected at adjoining end faces. It will not be necessary to provide supporting means which can be raised and lowered and serve to support the normally self-supporting portion of the train in the furnace. It will be sufficient to ensure that the carbon bodies of the normally self-supporting portion of the train can be supported by at least one support, which is provided under the normally self-supporting portion of the train and with said portion defines a clearance which is sufficient to permit a frictionless movement of the self-supporting portion of the train past the support. In that case a decrease of the axial compressive forces acting on the train will have the result that the carbon bodies are downwardly deflected only slightly until they engage the support. The clearance is only required to permit the self-supporting train to be moved without friction. It will be understood that the nature and number of the supports will depend on the number and size of the carbon bodies which are to be supported and will thus depend on the length of path along which the train is moved while it is self-supporting; that path will mainly extend between the electrode contact points to ensure a proper flow of current. The electrodes may also be used to support the train.

The process can be carried out by means of a graphitizing furnace which contains a graphitizing zone that is provided with at least two electrodes for supporting a train of carbon bodies. In the direction of movement of the train through the furnace the graphitizing zone is succeeded by a cooling zone. The furnace is also provided with a conveyor, which serves to convey the train and comprises two gripping heads, which are respectively disposed before and behind the graphitizing furnace and adapted to clamp the train between them and are adjustable along the axis of the furnace. Such arrangements are known in connection with furnaces which contain a protective gas atmosphere and in which the train is self-supporting while the train is moved through said furnace in said protective gas atmosphere. Because the carbon bodies of the train are interconnected at adjoining end faces by axial plugs or screws, positive joints will be established so that a radial offsetting of the carbon bodies will reliably be precluded even if the clamping forces are relatively weak.

In addition to the provision of means for connecting carbon bodies at their adjoining end faces it is possible to provide means for supporting the train when it has buckled and for defining a clearance with an unbuckled train particularly in the graphitizing zone so that upon a relief of the train by the gripping heads any buckling of the train of carbon bodies will be limited to such an extent that the carbon bodies will be forced back to their positions corresponding to a straight train when the gripping forces are re-exerted.

BRIEF DESCRIPTION OF THE DRAWING

FIG. 1 is a diagrammatic longitudinal sectional view showing a graphitizing furnace in accordance with the invention.

FIG. 2 is an enlarged transverse sectional view taken on line II—II in FIG. 1.

FIG. 3 is an enlarged sectional view taken on line III—III in FIG. 1.

FIG. 4 is a side elevation showing two adjacent carbon bodies of the train, which are torn open at the joint provided between them and are connected by a plug joint between adjoining end faces.

FIG. 5 is a transverse sectional view showing the train adjacent to a support.

DETAILED DESCRIPTION OF THE PREFERRED EMBODIMENT

The process in accordance with the invention will now be explained more in detail with reference to the drawing.

With reference to FIG. 1, carbon bodies 2 to be graphitized are axially clamped together to form a horizontal train 1, which is moved through the graphitizing furnace, in which a preheating zone 3 between an electrode 4 and an electrode array 5, a graphitizing zone 6 between electrode arrays 5 and 7, and a cooling zone 8 succeed each other in the direction of travel of the train 1 along a predetermined axial path. The graphitizing furnace contains a protective gas atmosphere in the preheating zone 3 and the graphitizing zone 6 and in the cooling zone 8 contains a bed consisting of a carbonaceous bulk material 9, such as coke or wood charcoal, for suitably supporting the train 1.

The carbon bodies 2 of the train 1 are moved in steps through the graphitizing furnace and for that purpose are first axially clamped together by and between two gripping heads, which are disposed outside the furnace adjacent to its entrance 11 and its exit 12, respectively. For the sake of clearness, only the gripping head 10 adjacent to the entrance 11 is shown. Between any two steps of the movement of the train, a carbon body 2 is added to the train 1 at the entrance 11 of the furnace and a carbon body is removed from the train at the exit 12 of the furnace. It is desired to accomplish that without a maintenance of the axial compressive forces, which would otherwise be required to ensure that the train will be self-supporting while it is moved between the train-supporting furnace electrodes. This is accomplished in that adjacent carbon bodies 2 of the train are interconnected at adjoining end faces by plugs 13, as is shown in FIG. 4. The joints formed by the plugs between adjoining end faces of the carbon bodies 2 are established whenever a new carbon body is added to the train at the entrance 11 of the furnace. The plugs, which may be replaced by screws, are preferably made of carbon, which is reinforced by carbon fibers, and are inserted into blind bores 14 formed in the end faces of the carbon bodies 2. Because the graphitized carbon bodies 2 are generally intended to be used as graphite electrodes, which are formed in their end faces with recesses 15 for receiving electrode holders, the provision of such plugs 13 or screws will usually not involve a loss of material because such plugs or screws are mounted in the carbon body in a portion which in the graphite electrode will be formed with the recess 15, as is apparent from FIG. 4. The current-conducting contact between the carbon bodies 2 outside the plugs 13 will be sufficient for providing an adequate current flow, particularly if an annular contact layer 16 of a material having a higher electrical conductivity than the material of the carbon bodies 2 is provided between adjoining end faces of the carbon bodies 2.

The furnace electrode 4 provided adjacent to the entrance 11 of the furnace may be constituted by an electrode plate, which is forced by the gripping head 10 against the trailing end face of the train 1. The electrode arrays 5 and 7 must be designed and arranged to permit a movement of the train 1 relative to such electrode arrays. For that reason bed 17 of carbonaceous bulk material is provided adjacent to the electrode arrays 5 and 7 and adjacent to the electrode array 7 that bed of bulk material may be constituted by the bed 9 of bulk material provided in the cooling zone. That bed 17 of bulk material is provided only along a portion of the length of the train 1 and will ensure the required contact between the electrodes 18 and the train 1 but will not adversely affect the movement of the train 1 relative to the stationary electrodes 18. The bed 17 is limited in the direction of travel of the train 1 by a partition 19 and any bulk material which is entrained by the train 1 through the partition 19 will be collected in a succeeding chamber 20 so that the succeeding graphitizing zone 6, which contains a protective gas atmosphere, will be free of bulk material. The bed 9 of bulk material in the cooling zone 8 and the bed 17 of bulk material adjacent to the electrode array 5 are continuously replenished through feed ducts 21 and 22 so that the losses of entrained bulk material will be compensated.

The train 1 which is conveyed through the graphitizing furnace is preheated in the preheating zone 3 between the electrodes 4 and 5 and is subsequently heated to the required graphitizing temperature between the electrode arrays 5 and 7 in the graphitizing zone 6. In order to reduce the heat losses, the furnace housing 23 is provided with a suitable heat insulation 24 adjacent to said zones. On the other hand, a heat dissipation from the cooling zone 8 through the furnace housing 23 is desired and for this reason the furnace is provided adjacent to the cooling zone 8 with means for dissipating heat from the bed 9 of bulk material and with means 25 for cooling the housing 23. The cooling means 25 comprise cooling pipes 26, which are flown through by a cooling fluid, as is particularly apparent from FIG. 3.

When it is desired to add a carbon body 2 which is to be graphitized to the train 1 at its trailing end and to remove a graphitized carbon body 2 from the train 1 at its leading end, the gripping heads 10 are disengaged from the train 1 and the train 1 will then be supported by the bed 9 of bulk material in the cooling zone 8, by the bed 17 of bulk material adjacent to the electrode array 5 and by supports 15 outside the graphitizing furnace when said supports have been engaged with the train 1 before it has been relieved from the axial compressive forces. Because the carbon bodies 2 are interconnected at adjoining end faces by plugs 13 or screws, that support of the train will be sufficient in many cases to keep any sag of the train 1 in a permissible range and to ensure that upon the re-exertion of the axial compressive forces the carbon bodies 2 can again be moved as a straight train through the graphitizing furnace.

On the other hand, if the portion in which the train is held to be self-supporting is so long that the sag of the train cannot be kept within permissible limits, additional means 28 will be required to support the normally self-supporting portion of the train when the train is relieved from the external gripping forces because carbon bodies are to be added to or removed from the train. Such additional supporting means 28 should ensure that the sagging of the normally self-supporting portion of the train will be restricted to a permissible extent whereas the movement of the self-supporting train 1 will not adversely be affected in that region. As a result, the advantages afforded by the use of a protective gas atmosphere adjacent to the current-conducting portions of the train and the advantages afforded by the provision of a bed 9 of bulk material in the cooling zone may be utilized whereas the disadvantages which would be involved in the provision of a protective gas atmosphere in the cooling zone and those involved in the provision of a bed of bulk material in the graphitizing zone will be avoided. In the embodiment shown in FIGS. 1 and 5 said supporting means 28 consist of two bars 29, which extend on opposite sides of and parallel to the path for the train 1 and extend with a clearance under the train 1 when it is straight, as is indicated in phantom. When the axial compressive forces have been decreased the carbon bodies 2 of the train 1 will be supported and transversely centered by the bars 29 so that an excessive sagging of the train will be prevented and a renewed axial clamping of the train 1 will have the result that the carbon bodies 2 are forced back to such positions that the train will again be straight and can be moved without friction past the bars 29. The bars 29 may be tubular or massive and must obviously withstand the temperatures to be encountered and for this reason preferably consist of carbon, which may optionally be reinforced by carbon fibers. Instead of the bars 29, it is possible to provide supports 28 formed with V-shaped grooves for receiving the carbon bodies 2, as is indicated in phantom in FIG. 5. Because the carbon bodies are interconnected at adjoining end faces, the carbon bodies 2 need not be transversely centered by means of the support 28 so that such supports may be flat, even if the carbon bodies may not exactly coaxially adjoin each other.

It will be understood that the invention is not restricted to the embodiment shown by way of example. For instance, a protective gas atmosphere may be provided also in the cooling zone 8 so that the train will have to be held to be self-supporting in a larger length. This will not significantly increase the structural expenditure because the carbon bodies 2 are interconnected by plugs, particularly if the train 1 when it is relaxed is supported by supports 28 which define a clearance with the train 1 when it is straight.

We claim:

1. In a process of graphitizing carbon bodies in a graphitizing furnace having an entrance, an exit, a graphitizing zone between said entrance and said exit, and a cooling zone between said graphitizing zone and said exit, which process comprises clamping a plurality of carbon bodies together to form a horizontally extending train, in which adjacent end faces of said carbon bodies adjoin each other, longitudinally moving said train in said graphitizing furnace from said entrance through said graphitizing zone and subsequently through said cooling zone to said exit, causing electric current to flow in said train in said graphitizing zone to heat said train, subsequently cooling said train in said cooling zone, adding from time to time a new carbon body to said train at its trailing end at said entrance and removing from time to time a carbon body from the leading end of said train at said exit, and said train is moved in said furnace in contact with furnace electrodes at two electrode contact points spaced apart along said train, the improvement comprising connecting said carbon bodies at adjoining end faces by axially extending connecting means in assembling said train so that said train is held to be self-supporting between said two electrode contact points.

2. The improvement set forth in claim 1, wherein said connecting means consist of plugs.

3. The improvement set forth in claim 1, wherein said connecting means consist of screws.

4. The improvement set forth in claim 1, wherein said axially extending connecting means consist of carbon reinforced by carbon fibers.

5. The improvement set forth in claim 1, wherein a layer of a material which has a higher electrical conductivity than the material of said carbon bodies is provided between said adjoining end faces of said carbon bodies of said train.

6. The improvement set forth in claim 1, wherein said train is supported by said furnace electrodes.

7. In a process of graphitizing carbon bodies in a graphitizing furnace having an entrance, an exit, a graphitizing zone between said entrance and said exit, and a cooling zone between said graphitizing zone and said exit, which process comprises clamping a plurality of carbon bodies together to form a horizontally extending train, in which adjacent end faces of said carbon bodies adjoin each other, longitudinally moving said train in said graphitizing furnace from said entrance through said graphitizing zone and subsequently through said cooling zone to said exit, causing electric current to flow in said train in said graphitizing zone to heat said train, subsequently cooling said train in said cooling zone, adding from time to time a new carbon body to said train at its trailing end at said entrance and removing from time to time a carbon body from the leading end of said train at said exit, and said train is moved in said furnace in contact with furnace electrodes at two electrode contact points spaced apart along said train, the improvement comprising connecting said carbon bodies at adjoining end faces by axially extending connecting means in assembling said train so that said train is held to be self-supporting between said two electrode contact points, exerting axial compressive forces on said train to render said train self-supporting, and relieving said train from said axial compressive forces before said new carbon body is added to said train and before a carbon body is removed from the leading end of the train.

8. The improvement set forth in claim 7, wherein said train is supported by supporting means in said graphitizing zone as said train is relieved from said axial compressive forces, and said train is held to be self-supporting by said axial compressive forces adjacent to said supporting means as said train is moved in said graphitizing zone.

9. The improvement set forth in claim 8, wherein a clearance is maintained between said supporting means and said train when it is held to be self-supporting between said electrode contact points as it is moved in said graphitizing zone.

10. The improvement set forth in claim 8, wherein said train is supported by said supporting means between said electrode contact points as said train is relieved from said axial compressive forces.

11. In an apparatus for graphitizing carbon bodies clamped together to form a horizontally extending train, in which adjacent end faces of said carbon bodies adjoin each other, which apparatus comprises a graphitizing furnace having an entrance, an exit, a graphitizing zone between said entrance and said exit, a cooling zone between said graphitizing zone and said exit, and furnace electrode means disposed in said graphitizing zone at two electrode contact points spaced apart along said graphitizing zone and arranged to support said train, and conveying means for longitudinally moving said train in said graphitizing furnace along a predetermined axial path from said entrance through said graphitizing zone in simultaneous contact with said electrodes at both said electrode contact points and subsequently through said cooling zone to said exit, wherein said furnace is provided with means for maintaining a protective gas atmosphere in said furnace in at least part of said furnace and said conveying means are operable to exert axial compressive forces on said train so as to hold said train to be self-supporting as it is moved in said graphitizing furnace between said two electrode contact points, the improvement residing in that said carbon bodies are connected at adjoining end faces by axially extending connecting means so that said train is held to be self-supporting between said two electrode contact points.

12. The improvement set forth in claim 11, wherein said connecting means consist of plugs.

13. The improvement set forth in claim 11, wherein said connecting means consist of screws.

14. The improvement set forth in claim 11 as applied to an apparatus in which said conveying means comprise first and second gripping heads, which are disposed outside said furnace adjacent to said entrance and to said exit, respectively, and are movable relative to said furnace in the direction of said path and operable to clamp said carbon bodies together to form said train and to hold said train to be self-supporting as it is moved in said graphitizing furnace between said two electrode contact points.

15. In an apparatus for graphitizing carbon bodies clamped together to form a horizontally extending train, in which adjacent end faces of said carbon bodies adjoin each other, which apparatus comprises a graphitizing furnace having an entrance, an exit, a graphitizing zone between said entrance and said exit, a cooling zone between said graphitizing zone and said exit, and furnace electrode means disposed in said graphitizing zone at two electrode contact points spaced apart along said graphitizing zone and arranged to support said train, and conveying means for longitudinally moving said train in said graphitizing furnace along a predetermined axial path from said entrance through said graphitizing zone in simultaneous contact with said electrodes at both said electrode contact points and subsequently through said cooling zone to said exit, wherein said furnace is provided with means for maintaining a protective gas atmosphere in said furnace in at least part of said furnace and said conveying means are operable to exert axial compressive forces on said train so as to hold said train to be self-supporting at it is moved in said graphitizing furnace between said two electrode contact points, the improvement residing in that said carbon bodies are connected at adjoining end faces by axially extending connecting means so that said train is held to be self-supporting between said two electrode contact points, said conveying means comprises first and second gripping heads disposed outside said furnace adjacent to said entrance and said exit, respectively, and movable relative to said furnace in the direction of said path and operable to clamp said carbon bodies together to form said train, to hold said train to be self-supporting as it is moved in said graphitizing furnace between said two electrode contact points and to relieve said train from said axial compressive forces, and said furnace comprises supporting means for supporting said train in said graphitizing zone when said train is relieved from said axial compressive forces, said supporting means being arranged to define a clearance with said train as it is held to be self-supporting between said electrode contact points.

* * * * *